US012669374B2

(12) United States Patent
Moriyama et al.

(10) Patent No.: US 12,669,374 B2
(45) Date of Patent: Jun. 30, 2026

(54) COLOR MEASUREMENT APPARATUS AND CONTROL METHOD

(71) Applicant: SEIKO EPSON CORPORATION, Tokyo (JP)

(72) Inventors: Masahide Moriyama, Matsumoto (JP); Masayoshi Miyakawa, Suwa (JP); Toru Hayashi, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 45 days.

(21) Appl. No.: 18/598,725

(22) Filed: Mar. 7, 2024

(65) Prior Publication Data

US 2024/0302209 A1 Sep. 12, 2024

(30) Foreign Application Priority Data

Mar. 8, 2023 (JP) ................................. 2023-035341
May 31, 2023 (JP) ................................. 2023-089634

(51) Int. Cl.
*G01J 3/02* (2006.01)
*G01J 3/06* (2006.01)

(52) U.S. Cl.
CPC ........... *G01J 3/0289* (2013.01); *G01J 3/0267* (2013.01); *G01J 3/06* (2013.01); *G01J 2003/061* (2013.01)

(58) Field of Classification Search
CPC .. G01J 2003/061; G01J 3/0202; G01J 3/0267; G01J 3/027; G01J 3/0289; G01J 3/06; G01J 3/50; G01J 3/524; H04N 1/6044
See application file for complete search history.

(56) References Cited

U.S. PATENT DOCUMENTS

| | | | |
|---|---|---|---|
| 3,886,371 | A | 5/1975 | Lloyd |
| 10,406,819 | B2 | 9/2019 | Fukuda et al. |
| 2002/0054292 | A1 | 5/2002 | Orelli et al. |
| 2007/0151830 | A1 | 7/2007 | Kawamata |
| 2008/0174763 | A1 | 7/2008 | Ehbets |
| 2012/0253727 | A1 | 10/2012 | Lianza |

(Continued)

FOREIGN PATENT DOCUMENTS

| | | |
|---|---|---|
| EP | 2691238 | 3/2017 |
| JP | H08-327455 A | 12/1996 |

(Continued)

*Primary Examiner* — Hina F Ayub
(74) *Attorney, Agent, or Firm* — WORKMAN NYDEGGER

(57) ABSTRACT

A color measurement apparatus to which a colorimeter that measures a color of a patch of a color measurement target is configured to be attached includes a support base that supports the color measurement target, a carriage that supports the colorimeter, a scanning mechanism portion that causes the carriage to perform scanning on the support base, and a control portion that controls the scanning mechanism portion, in which the carriage includes a support portion that has an opening portion that exposes a color measurement portion from the carriage in a state in which the colorimeter is supported, and a first measurement portion and a second measurement portion that are provided to interpose the opening portion, and the control portion specifies a position of the patch by measurement results of a measured portion by the first measurement portion and the second measurement portion.

6 Claims, 13 Drawing Sheets

(56)                    References Cited

U.S. PATENT DOCUMENTS

| 2020/0070539 | A1 | 3/2020 | Kobayashi et al. |
| 2020/0269607 | A1 | 8/2020 | Masuda |

FOREIGN PATENT DOCUMENTS

| JP | 2000-241248 | A | 9/2000 | |
| JP | 2013184430 | | 9/2013 | |
| JP | 2016-212001 | A | 12/2016 | |
| JP | 2018052107 | | 4/2018 | |
| WO | 2016/181721 | | 11/2016 | |
| WO | WO-2016181721 | A1 * | 11/2016 | ................ G01J 3/50 |

* cited by examiner

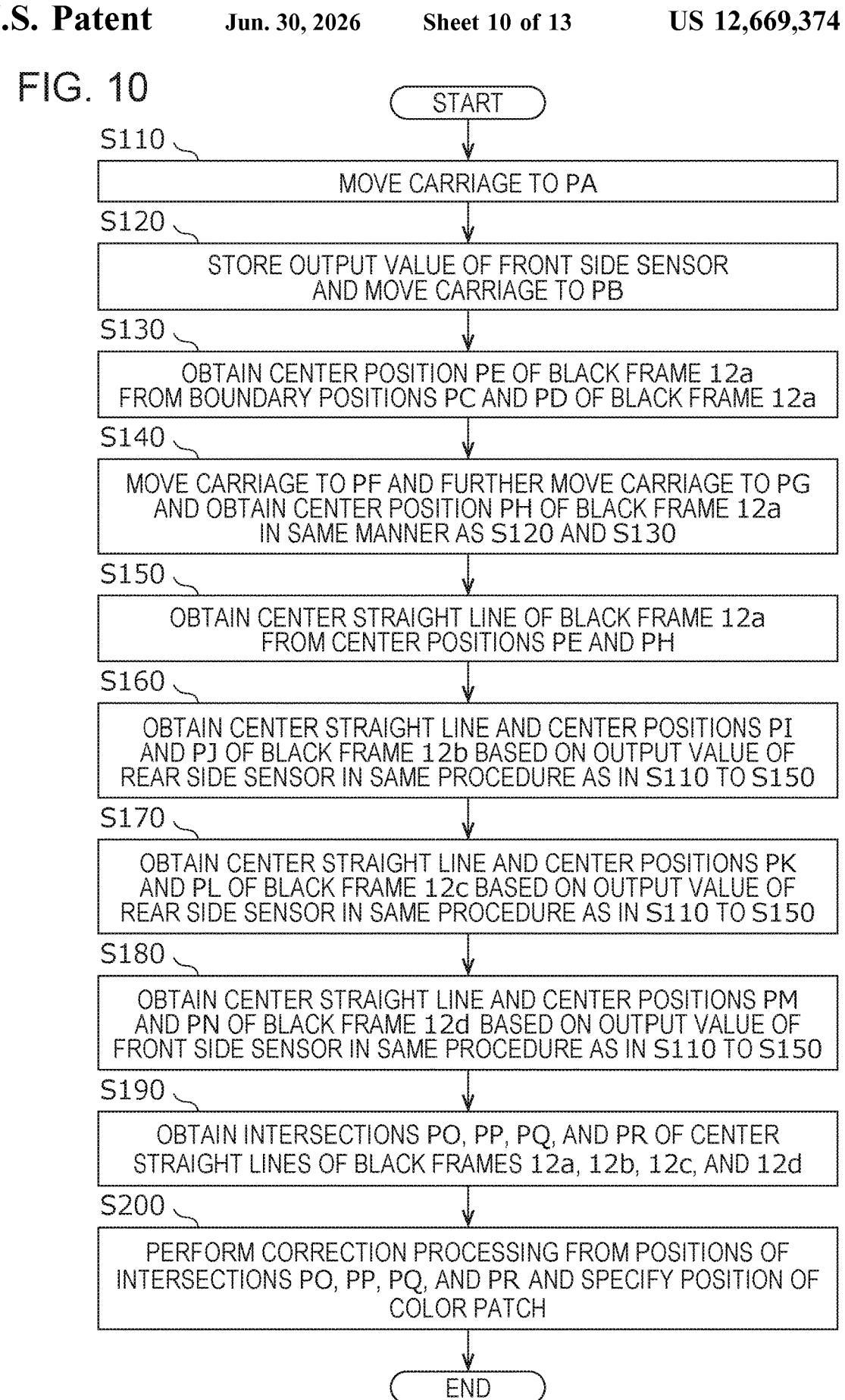

START

S110
MOVE CARRIAGE TO PA

S120
STORE OUTPUT VALUE OF FRONT SIDE SENSOR
AND MOVE CARRIAGE TO PB

S130
OBTAIN CENTER POSITION PE OF BLACK FRAME 12a
FROM BOUNDARY POSITIONS PC AND PD OF BLACK FRAME 12a

S140
MOVE CARRIAGE TO PF AND FURTHER MOVE CARRIAGE TO PG
AND OBTAIN CENTER POSITION PH OF BLACK FRAME 12a
IN SAME MANNER AS S120 AND S130

S150
OBTAIN CENTER STRAIGHT LINE OF BLACK FRAME 12a
FROM CENTER POSITIONS PE AND PH

S160
OBTAIN CENTER STRAIGHT LINE AND CENTER POSITIONS PI
AND PJ OF BLACK FRAME 12b BASED ON OUTPUT VALUE OF
REAR SIDE SENSOR IN SAME PROCEDURE AS IN S110 TO S150

S170
OBTAIN CENTER STRAIGHT LINE AND CENTER POSITIONS PK
AND PL OF BLACK FRAME 12c BASED ON OUTPUT VALUE OF
REAR SIDE SENSOR IN SAME PROCEDURE AS IN S110 TO S150

S180
OBTAIN CENTER STRAIGHT LINE AND CENTER POSITIONS PM
AND PN OF BLACK FRAME 12d BASED ON OUTPUT VALUE OF
FRONT SIDE SENSOR IN SAME PROCEDURE AS IN S110 TO S150

S190
OBTAIN INTERSECTIONS PO, PP, PQ, AND PR OF CENTER
STRAIGHT LINES OF BLACK FRAMES 12a, 12b, 12c, AND 12d

S200
PERFORM CORRECTION PROCESSING FROM POSITIONS OF
INTERSECTIONS PO, PP, PQ, AND PR AND SPECIFY POSITION OF
COLOR PATCH

END

COLOR MEASUREMENT APPARATUS AND CONTROL METHOD

The present application is based on, and claims priority from JP Application Serial Number 2023-035341, filed Mar. 8, 2023 and JP Application Serial Number 2023-089634, filed May 31, 2023, the disclosures of which are hereby incorporated by reference herein in their entirety.

BACKGROUND

1. Technical Field

The present disclosure relates to a color measurement apparatus and a control method.

2. Related Art

In the related art, various color measurement apparatuses that measure a color of a color measurement target are used. Among the above, there is a color measurement apparatus configured to measure a color of a patch of a color measurement target provided with the patch and a measured portion used for grasping a position of the patch, or the like. For example, JP-A-2000-241248 discloses a color measurement apparatus configured to measure a patch of a color measurement target provided by a first reference line or the like to perform highly accurate color measurement. By grasping the inclination of the first reference line, the inclination of the color measurement target can be grasped. In addition, JP-A-2016-212001 discloses an automatic color measurement apparatus to which a colorimeter that measures a color of a measured object is detachably attached. The automatic color measurement apparatus of JP-A-2016-212001 is a color measurement apparatus in which a colorimeter that is a color measurement portion performs color measurement in a non-contact state with respect to a measured object that is a color measurement target.

However, in the color measurement apparatus of JP-A-2000-241248, when the inclination of the first reference line is grasped, the colorimeter needs to be moved beyond a length of the first reference line in an extending direction, so that the size of the color measurement apparatus increases. In the automatic color measurement apparatus of JP-A-2016-212001, although the technique of JP-A-2000-241248 is employed, an area in which the colorimeter is moved along the color measurement surface of the color measurement target remains large, so that the size of the color measurement apparatus increases. Therefore, in the color measurement apparatus of the related art, it is difficult to measure the color of the patch provided on the color measurement target without causing a positional deviation and without increasing the size of the color measurement apparatus.

SUMMARY

According to an aspect of the present disclosure, there is provided a color measurement apparatus to which a colorimeter that measures a color of a patch of a color measurement target provided with the patch and a measured portion for grasping a position of the patch is configured to be attached, the color measurement apparatus including a support base that supports the color measurement target, a carriage that supports the colorimeter, a scanning mechanism portion that causes the carriage to perform scanning on the support base, and a control portion that controls the scanning mechanism portion, in which the carriage includes a support portion that supports the colorimeter and has an opening portion that exposes a color measurement portion of the colorimeter from the carriage in a state in which the colorimeter is supported by the support portion, and a first measurement portion and a second measurement portion that measure the measured portion and are provided to interpose the opening portion, and the control portion specifies a position of the patch by measurement results of the first measurement portion and the second measurement portion.

According to another aspect of the present disclosure, there is provided a control method that controls a color measurement apparatus to which a colorimeter that measures a color of a patch of a color measurement target provided with the patch and a measured portion for grasping a position of the patch is configured to be attached, the color measurement apparatus including a support base that supports the color measurement target, a carriage that supports the colorimeter, and a scanning mechanism portion that causes the carriage to perform scanning on the support base, in which the carriage includes a support portion that supports the colorimeter and has an opening portion that exposes a color measurement portion of the colorimeter from the carriage in a state in which the colorimeter is supported by the support portion, and a first measurement portion and a second measurement portion that measure the measured portion and are provided to interpose the opening portion, the control method including specifying a position of the patch by measurement results of the first measurement portion and the second measurement portion.

BRIEF DESCRIPTION OF THE DRAWINGS

FIG. 2 is a perspective view of the color measurement apparatus according to the example of the present disclosure.

FIG. 10 is an example of a control method performed using the color measurement apparatus according to the example of the present disclosure, and is a flowchart illustrating a flow in which a position of a patch is specified by a measurement result of a measured portion by a first measurement portion and a second measurement portion.

FIG. 11 is a view of the color measurement target, and is a view for describing positions of the first measurement portion and the second measurement portion when a measured portion is measured by the first measurement portion and the second measurement portion.

FIG. 13 is a view for describing a method of manually specifying a position of a patch when the position of the patch cannot be automatically specified using the color measurement apparatus according to the example of the present disclosure.

DESCRIPTION OF EMBODIMENTS

Figure 1:
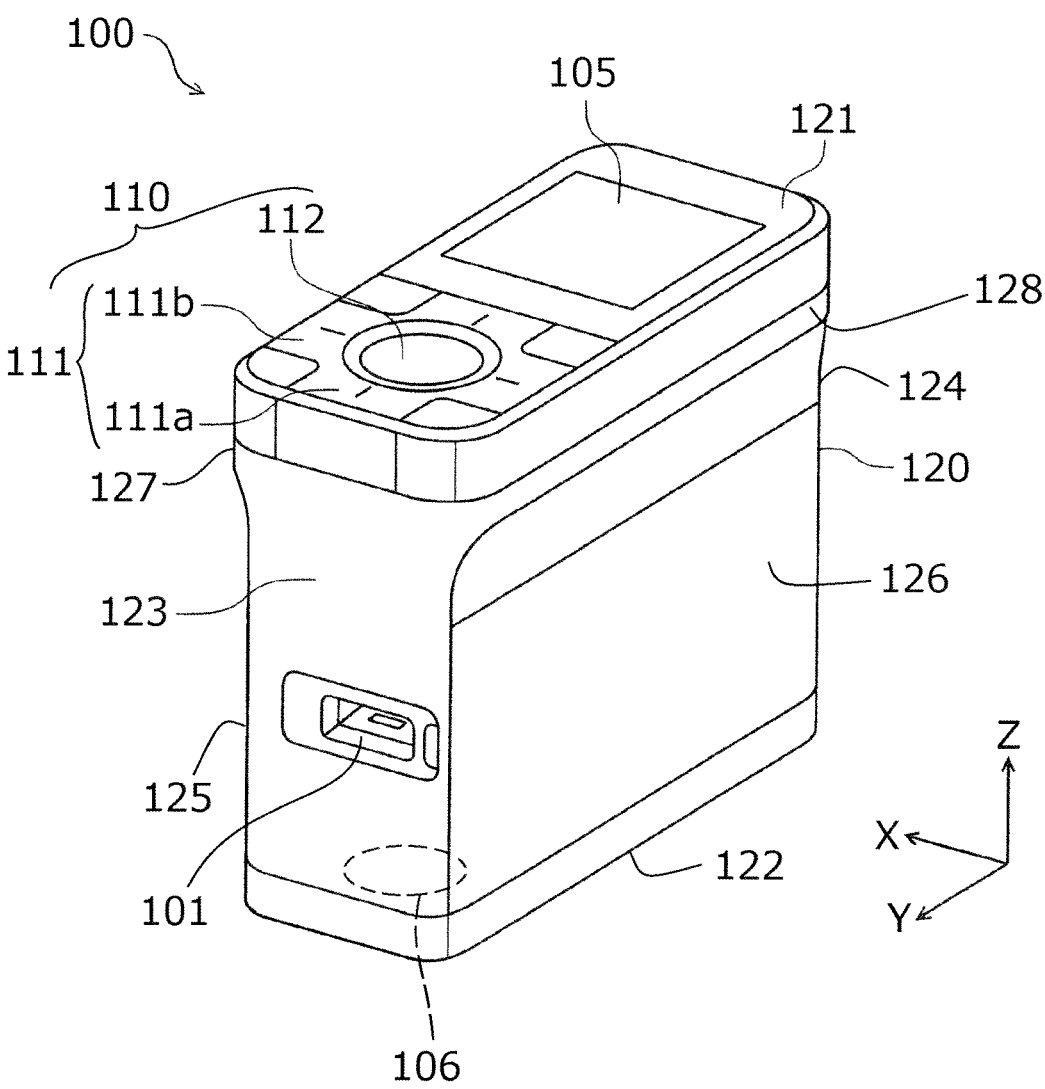
FIG. 1 is a schematic perspective view of a colorimeter that can be used in a color measurement apparatus according to an example of the present disclosure.

Hereinafter, the present disclosure will be schematically described.

A color measurement apparatus according to a first aspect is a color measurement apparatus to which a colorimeter that measures a color of a patch of a color measurement target provided with the patch and a measured portion for grasping a position of the patch is configured to be attached, the color measurement apparatus including a support base that supports the color measurement target, a carriage that supports the colorimeter, a scanning mechanism portion that causes the carriage to perform scanning on the support base, and a control portion that controls the scanning mechanism portion, in which the carriage includes a support portion that supports the colorimeter and has an opening portion that exposes a color measurement portion of the colorimeter from the carriage in a state in which the colorimeter is supported by the support portion, and a first measurement portion and a second measurement portion that measure the measured portion and are provided to interpose the opening portion, and the control portion specifies a position of the patch by measurement results of the first measurement portion and the second measurement portion.

According to the present aspect, a position of the patch is specified by measurement results of the first measurement portion and the second measurement portion provided to interpose the opening portion. That is, the measured portion can be measured by one of the first measurement portion and the second measurement portion in which a movement distance of the carriage with respect to the measured portion is shortened. Since the first measurement portion and the second measurement portion are provided to interpose the opening portion, the movement distance of the carriage can be shortened at least by the length of the opening portion. Therefore, by measuring the measured portion, the position of the patch provided on the color measurement target can be grasped from the measurement position of the measured portion, and the size of the color measurement apparatus can be suppressed from being increased by shortening the movement distance of the carriage. Therefore, without increasing the size of the color measurement apparatus, color measurement can be performed on the patch provided on the color measurement target without causing a positional deviation.

Next, the color measurement apparatus according to a second aspect is an aspect involved in the first aspect, in which the scanning mechanism portion is configured to move the carriage in a first direction and in a second direction intersecting the first direction, and the first measurement portion and the second measurement portion are provided at different positions in any direction of the first direction and the second direction.

According to the present aspect, the carriage is movable in the first direction and the second direction, and the first measurement portion and the second measurement portion are provided at different positions in any direction of the first direction and the second direction. Therefore, for example, the movement distance of the carriage can be shortened even in the first direction and even in the second direction with respect to the color measurement target in which the measured portions are provided at two different positions in the first direction and two different positions in the second direction. Therefore, by particularly effectively suppressing the size of the color measurement apparatus from being increased, color measurement can be performed on the patch provided on the color measurement target without causing a positional deviation.

Next, the color measurement apparatus according to a third aspect is an aspect involved in the first or second aspect, in which the color measurement target is a quadrangle and provided with a linear measured portion as the measured portion along four sides of the color measurement target, and the control portion specifies the position of the patch based on results obtained by the first measurement portion and the second measurement portion measuring the linear measured portion.

According to the present aspect, with respect to the color measurement target that is a quadrangle and provided with the linear measured portion as the measured portion along the four sides, a position of the patch is specified based on results obtained by the first measurement portion and the second measurement portion measuring the linear measured portion. With such a configuration, since the four sides can be measured, for example, by calculating intersections of the four sides, the inclination or the like of the color measurement target with respect to the support base can be accurately grasped, and the position of the patch can be particularly accurately specified.

Next, the color measurement apparatus according to a fourth aspect is an aspect involved in the third aspect, in which the control portion calculates positions of four straight lines along the linear measured portion and positions of intersections of the straight lines based on results obtained by the first measurement portion and the second measurement portion measuring the linear measured portion corresponding to every side of the color measurement target at at least two points, and specifies the position of the patch based on the calculated position of the intersection.

For example, the color measurement target made of a soft material is easily deformed, and the color measurement target having a rectangular shape may be changed into a trapezoidal shape and be supported by the support base. In such a case, when an attempt is made to specify the position of the patch assuming that the color measurement target is rectangular, there is a concern that the position of the patch deviates from an actual position. However, according to the present aspect, positions of four straight lines along the linear measured portion and positions of intersections of the straight lines are calculated based on results obtained by the first measurement portion and the second measurement portion measuring the linear measured portion corresponding to every side of the color measurement target at at least two points, and a position of the patch is specified based on the calculated position of the intersection. Therefore, although the color measurement target having a rectangular shape is changed into being in a trapezoidal shape and is supported by the support base, the fact that the color measurement target is changed into being in a trapezoidal shape and is supported by the support base can be grasped based on the measurement results of the first measurement portion and the second measurement portion, and the position of the patch is accurately specified based on the calculated position of the intersection.

Next, the color measurement apparatus according to a fifth aspect is an aspect involved in any one of the first to fourth aspects, in which the color measurement target is a quadrangle and is provided with a corner measured portion as the measured portion at at least three corners of four corners of the color measurement target, and the control portion specifies an orientation of the color measurement target supported by the support base based on results obtained by the first measurement portion and the second measurement portion measuring the corner measured portion.

For example, due to a user mistake or the like, the color measurement target having a rectangular shape may be supported by the support base in a direction rotated by 180° when viewed from the support direction of the support base. However, according to the present aspect, with respect to the color measurement target that is a quadrangle and provided with a corner measured portion as the measured portion at at least three corners of four corners of the color measurement target, an orientation of the color measurement target supported by the support base is specified base based on results obtained by the first measurement portion and the second measurement portion measuring the corner measured portion. Therefore, although the color measurement target having a rectangular shape is supported by the support base in a direction rotated by 180° when viewed from the support direction of the support base, this can be recognized, and the position of the patch can be accurately specified.

Next, the control method according to a sixth aspect is a control method that controls a color measurement apparatus to which a colorimeter that measures a color of a patch of a color measurement target provided with the patch and a measured portion for grasping a position of the patch is configured to be attached, the color measurement apparatus including a support base that supports the color measurement target, a carriage that supports the colorimeter, and a scanning mechanism portion that causes the carriage to perform scanning on the support base, in which the carriage includes a support portion that supports the colorimeter and has an opening portion that exposes a color measurement portion of the colorimeter from the carriage in a state in which the colorimeter is supported by the support portion, and a first measurement portion and a second measurement portion that measure the measured portion and are provided to interpose the opening portion, the control method including specifying a position of the patch by measurement results of the first measurement portion and the second measurement portion.

According to the present aspect, a position of the patch is specified by measurement results of the first measurement portion and the second measurement portion provided to interpose the opening portion. That is, the measured portion can be measured by one of the first measurement portion and the second measurement portion in which a movement distance of the carriage with respect to the measured portion is shortened. Since the first measurement portion and the second measurement portion are provided to interpose the opening portion, the movement distance of the carriage can be shortened at least by the length of the opening portion. Therefore, by measuring the measured portion, the position of the patch provided on the color measurement target can be grasped from the measurement position of the measured portion, and the size of the color measurement apparatus can be suppressed from being increased by shortening the movement distance of the carriage. Therefore, without increasing the size of the color measurement apparatus, color measurement can be performed on the patch provided on the color measurement target without causing a positional deviation.

Hereinafter, the present disclosure will be specifically described.

An X-Y-Z coordinate system illustrated in each drawing is an orthogonal coordinate system, an X-Y plane is a horizontal plane, and an X-Z plane and a Y-Z plane are vertical planes. Here, the Z-axis direction is a vertical direction, that is, a height direction, and a +Z direction is a vertically upward direction and a –Z direction is a vertically downward direction. In addition, the X-axis direction is a horizontal direction orthogonal to the Z-axis direction that is a vertical direction. In addition, the Y-axis direction is a horizontal direction and is a direction orthogonal to both the X-axis direction and the Z-axis direction. In the following description, the +Y direction side of a color measurement apparatus 1 is referred to as the rear direction side, the –Y direction side of the color measurement apparatus 1 is referred to as the front direction side, the +X direction side of the color measurement apparatus 1 is referred to as the right direction side, and the –X direction side of the color measurement apparatus 1 is referred to as the left direction side.

Figure 2:
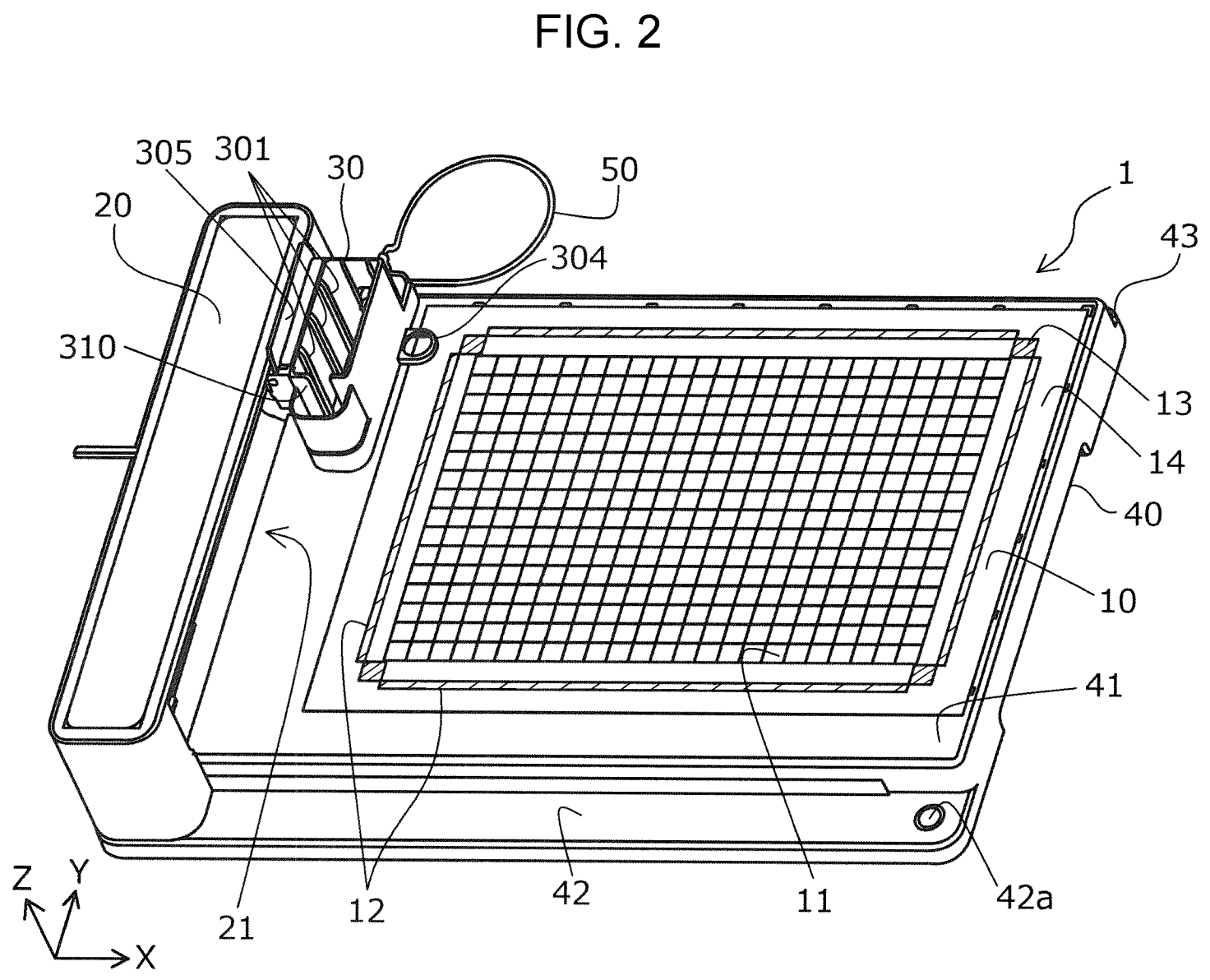

First, with reference to FIG. 1, an example of a colorimeter 100 that can be used in the color measurement apparatus 1 according to an example of the present disclosure will be described. The colorimeter 100 according to the present example includes a color measurement port 106, and is an optical device that emits light in the –Z direction from the color measurement port 106 and performs color measurement by receiving light reflected by a color chart 10, which is a color measurement target, as illustrated in FIG. 2. In other words, the optical axis direction is the Z-axis direction, and the position of the optical axis corresponds to the position of the color measurement port 106.

The colorimeter 100 according to the present example includes a casing 120 having an upper surface 121 that is a surface on the +Z direction side, a color measurement surface 122 that is a bottom surface on the –Z direction side and is provided with the color measurement port 106, a rear surface 123 that is a surface on the +Y direction side, a front surface 124 that is a surface on the –Y direction side, a right surface 125 that is a surface on the +X direction side, and a left surface 126 that is a surface on the –X direction side.

An operation portion 110 and a screen portion 105 are disposed on the upper surface 121 in the Y-axis direction. Specifically, the operation portion 110 is provided on the +Y direction side of the upper surface 121, and the screen portion 105 is provided on the −Y direction side of the upper surface 121. The operation portion 110 includes a plus-shaped button 111 configured with a bar shape 111a extending in the Y-axis direction and a bar shape 111b extending in the X-axis direction, and a determination button 112 provided at the center of the plus-shaped button 111. For example, a user moves the menus to be activated in front/ rear and left/right directions by pressing the plus-shaped button 111 with respect to a plurality of menus displayed on the screen portion 105, and can determine the desired menu by pressing the determination button 112.

A terminal 101 to which a USB cable 50 illustrated in FIG. 2 or the like can be coupled is provided on the rear surface 123. In addition, the colorimeter 100 of the present example is provided with a projection portion 127 and a projection portion 128 that are projected toward the outside when viewed in the Y-axis direction. Specifically, the projection portion 127 is provided in an area on the +Z direction side as compared with the center portion of the right surface 125 in the Z-axis direction, and the projection portion 128 is provided in an area on the +Z direction side as compared with the center portion of the left surface 126 in the Z-axis direction.

Next, a detailed configuration of the color measurement apparatus 1 according to the example of the present disclosure will be described with reference to FIGS. 2 to 9. FIG. 2 illustrates a configuration of the color measurement apparatus 1 of the present example. The color measurement apparatus 1 includes a main body portion 40 having a support base 41 extending in the X-axis direction and the Y-axis direction, and further includes a gantry 20 extending in the Y-axis direction to cover a portion of the support base 41 from the +Z direction side.

A carriage 30 having a support portion 310 that can accommodate the colorimeter 100 is attached to the gantry 20. The gantry 20 can move in the X-axis direction with respect to the support base 41, and the carriage 30 can move in the Y-axis direction with respect to the gantry 20. These movements are also referred to as scanning. Here, the carriage 30 can move in the Y-axis direction with respect to the gantry 20, and can also move in the Z-axis direction with respect to the gantry 20. One end of the USB cable 50 is coupled to the gantry 20 and the other end of the USB cable 50 is coupled to the colorimeter 100 accommodated in the carriage 30.

The color chart 10, which is an example of a measurement target, can be placed on the support base 41, and the color chart 10 is composed by, for example, a plurality of color patches 11, a black frame 12, a corner measured portion 13 are provided on a fabric portion 14. The color chart 10 is fixed to the support base 41 by, for example, attaching an adhesive tape at a periphery of the color chart 10, and corresponds to automatic color measurement up to A3 size, for example. However, since the gantry 20 has a gate shape when viewed from the X-axis direction and has a space portion 21 corresponding to the gate shape, a long paper that exceeds the A3 size can be also placed in the X-axis direction on the support base 41. The details of the color chart 10 will be described later.

On the −Y direction side of the main body portion 40, a front surface 42 is provided at a position lower in the −Z direction side than the support base 41, and on the +Y direction side of the main body portion 40, a rear surface 43 is provided at a position lower in the −Z direction side than the support base 41. A power button 42a that is an example of an operation portion of the color measurement apparatus 1 is provided on the front surface 42.

Figure 3:
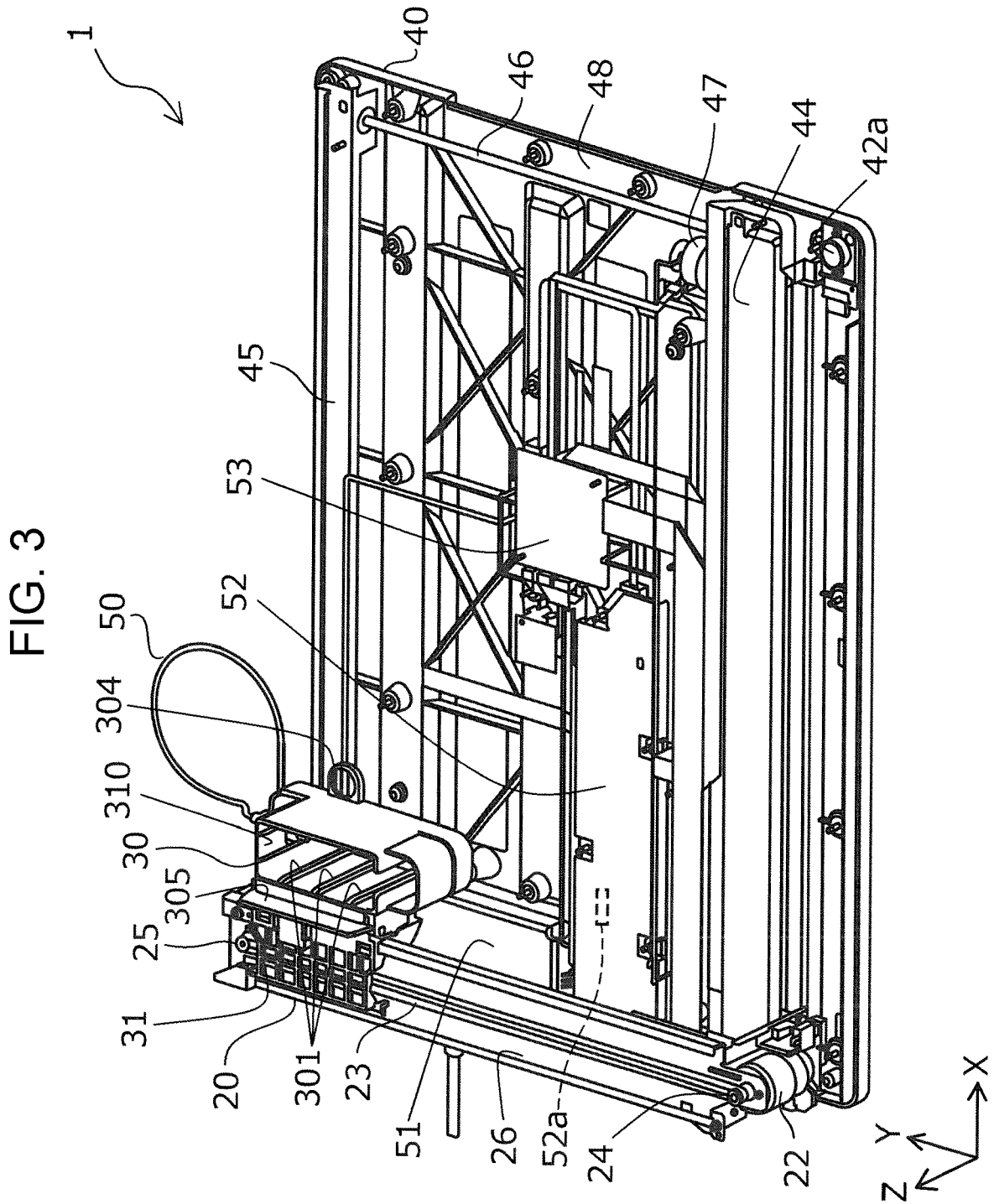
FIG. 3 is a perspective view illustrating an internal configuration of the color measurement apparatus according to the example of the present disclosure.

FIG. 3 illustrates an internal configuration of the color measurement apparatus 1, and is a view in which the exterior component of FIG. 2 is removed. On the +Z direction side above a case lower 48, the front frame 44 and the rear frame 45 are disposed to extend in the X-axis direction at an interval, and a gantry frame 26 having a gate shape and composing a portion of the gantry 20 moves in the X-axis direction along the front frame 44 and the rear frame 45.

The front frame 44 and the rear frame 45 are coupled by a coupling shaft 46 at a position on the +X direction side of the main body portion 40, and the rotational drive of a gantry motor 47 is transmitted from the gantry motor 47, which is a power source for moving the gantry 20 in the X-axis direction, to the coupling shaft 46 via a gear group (not illustrated). By the rotational drive transmitted to the coupling shaft 46, an endless belt (not illustrated) hung on a pulley (not illustrated) provided on the side of the front frame 44 that is the −Y direction side of the coupling shaft 46, and an endless belt (not illustrated) hung on a pulley (not illustrated) provided on the side of the rear frame 45 that is the +Y direction side of the coupling shaft 46 are rotated, and the gantry frame 26 coupled to the endless belts is moved.

A carriage motor 22 is fixed to the front side corresponding to the −Y direction side of the gantry frame 26, and an endless carriage belt 23 hung on a front pulley 24 and a back pulley 25 rotates via the front pulley 24 coupled to the carriage motor 22. A carriage slider 31, which composes a portion of the carriage 30, is fixed to the carriage belt 23, and moves along the Y-axis direction in accordance with the pivoting operation of the carriage belt 23 accompanying the pivoting operation of the carriage motor 22. Inside the main body portion 40, a main substrate 52, a sub-substrate 53, a power supply box 51, or the like as a control portion are provided. The main substrate 52 as the control portion is provided with a non-volatile storage portion 52a that can store information.

Figure 4:
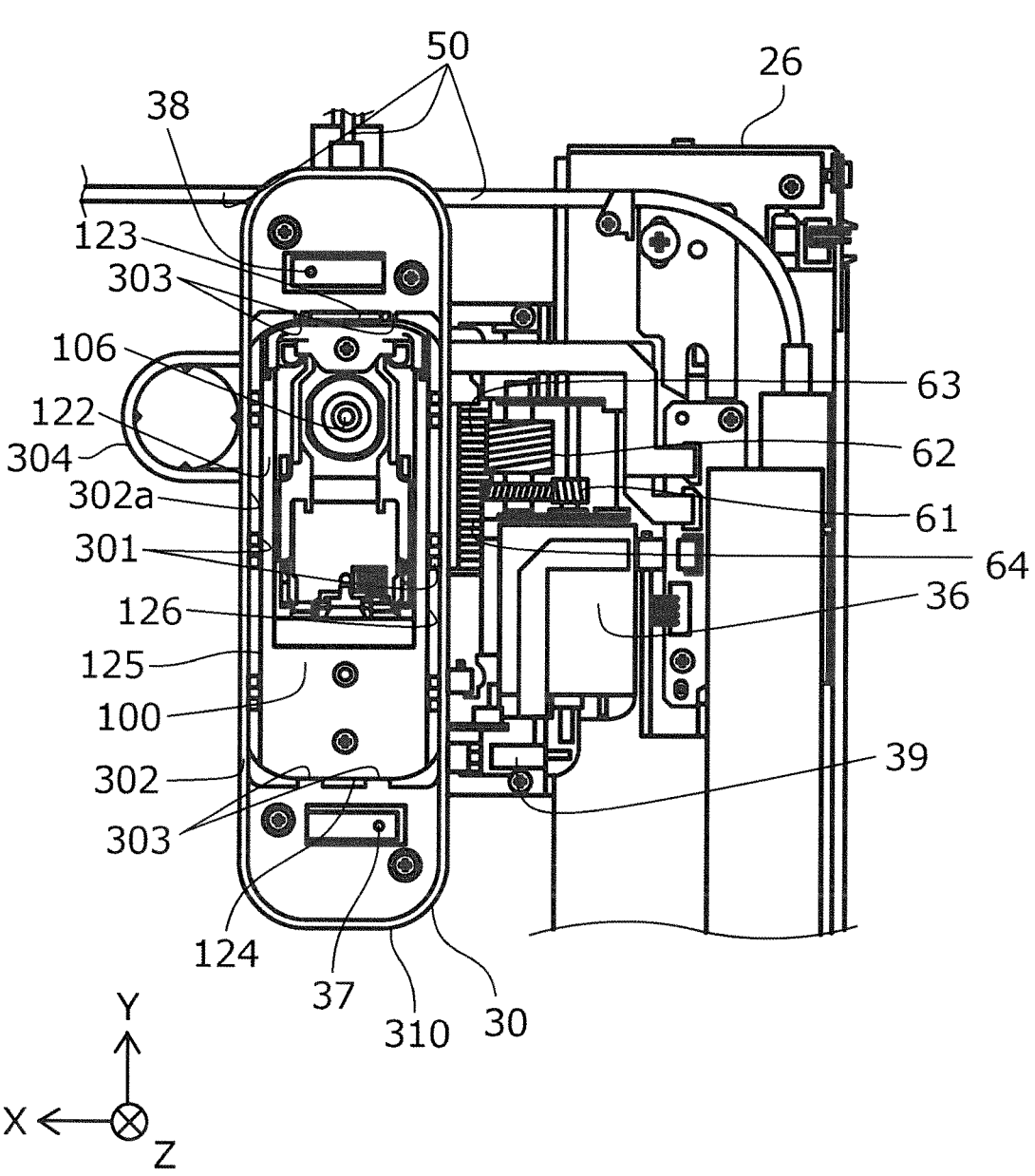
FIG. 4 is a bottom view illustrating a periphery of a carriage of the color measurement apparatus according to the example of the present disclosure, and is a view illustrating a state in which the colorimeter of FIG. 1 is accommodated.

FIG. 4 is a bottom view illustrating a periphery of the carriage 30 in a state in which the colorimeter 100 is attached to the carriage 30. The colorimeter 100 is supported by the carriage 30, in which the right surface 125 and the left surface 126 are supported in the Y-axis direction by a rib 301 provided on the carriage 30, and the rear surface 123 and the front surface 124 are supported in the X-axis direction by a rib 303 provided on the carriage 30. As illustrated in FIG. 4, a front side sensor 37 and a rear side sensor 38 that are configured to measure the width of the color chart 10 and the position of the color patch 11 by reading the position of the black frame 12 of the color chart 10, are provided on the surface on the −Z direction side of the carriage 30. Details of the front side sensor 37 and the rear side sensor 38 will be described later.

Figure 5:
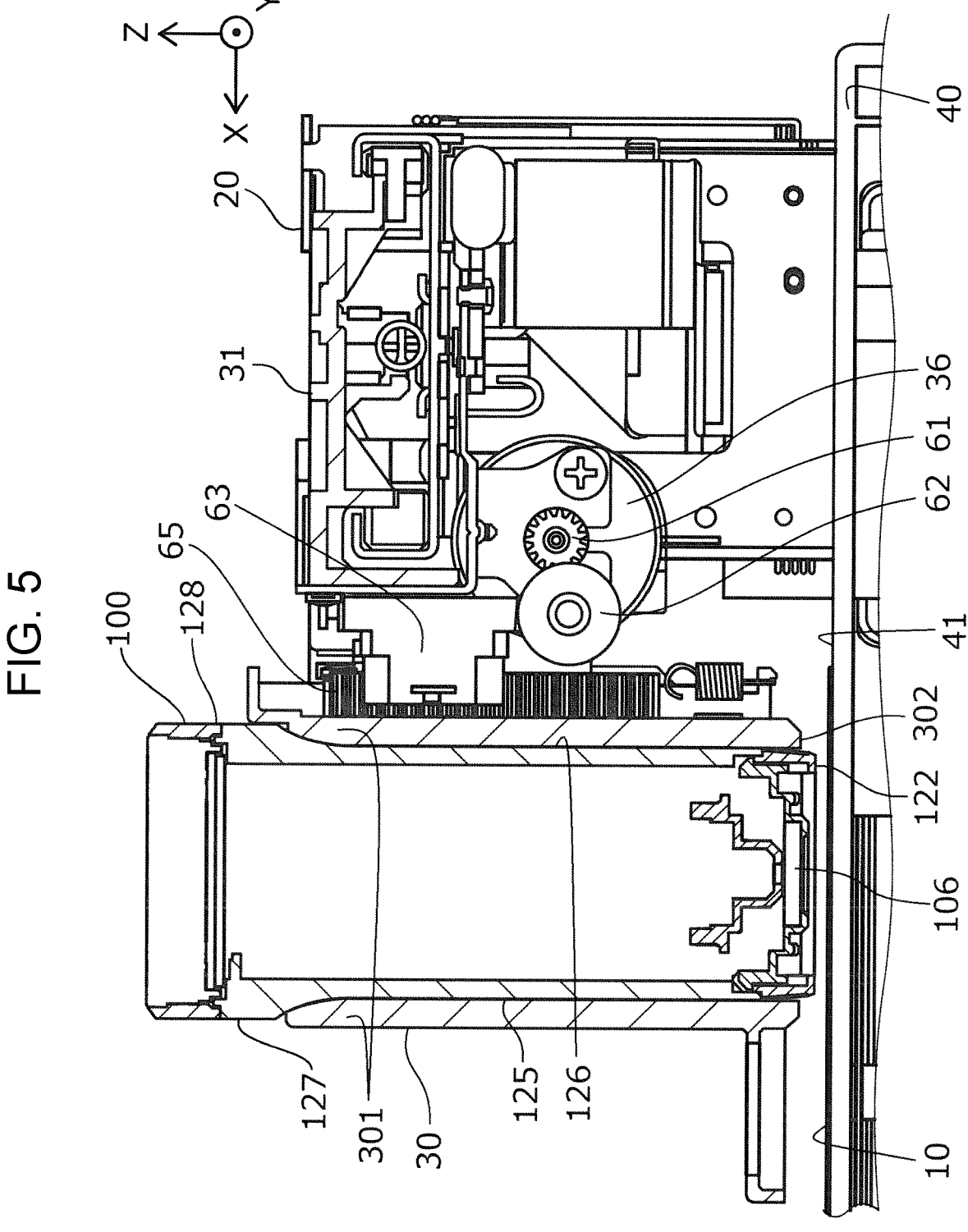
FIG. 5 is a rear view illustrating a periphery of the carriage of the color measurement apparatus according to the example of the present disclosure, and is a view illustrating a disposition when the colorimeter of FIG. 1 is accommodated and the carriage is caused to perform scanning.

In the carriage 30, the power of the Z-axis movement direction movement motor 36, which is a drive source, is transmitted to the motor gear 61, the worm gear 62, the first driving gear 63, and the second driving gear 64 in this order, so that the carriage 30 slidably moves in the Z-axis direction with respect to the gantry 20 via the rack gear 65 illustrated in FIG. 5 or the like. In addition, as illustrated in FIG. 4, the carriage 30 is provided with a home position sensor 39 that measures whether or not the position of the carriage 30 in the Z-axis direction with respect to the gantry 20 is a home position.

Next, mainly with reference to FIGS. 5 to 9, the position of the carriage 30 in the Z-axis direction with respect to the gantry 20, that is, the position of the carriage 30 and the colorimeter 100 accommodated in the carriage 30 in the Z-axis direction with respect to the measurement target placed on the support base 41 will be described. FIG. 5 is a view illustrating a disposition when the carriage 30 performs scanning in a state in which the colorimeter 100 is accommodated in the carriage 30, that is, when the carriage 30 is moved along the Y-axis direction with respect to the gantry 20. At this time, both the color measurement surface 122 of the colorimeter 100 and a bottom surface 302 of the carriage 30 are in a state in which a gap is vacant in the Z-axis direction with respect to the color chart 10 that is a measurement target.

Figure 6:
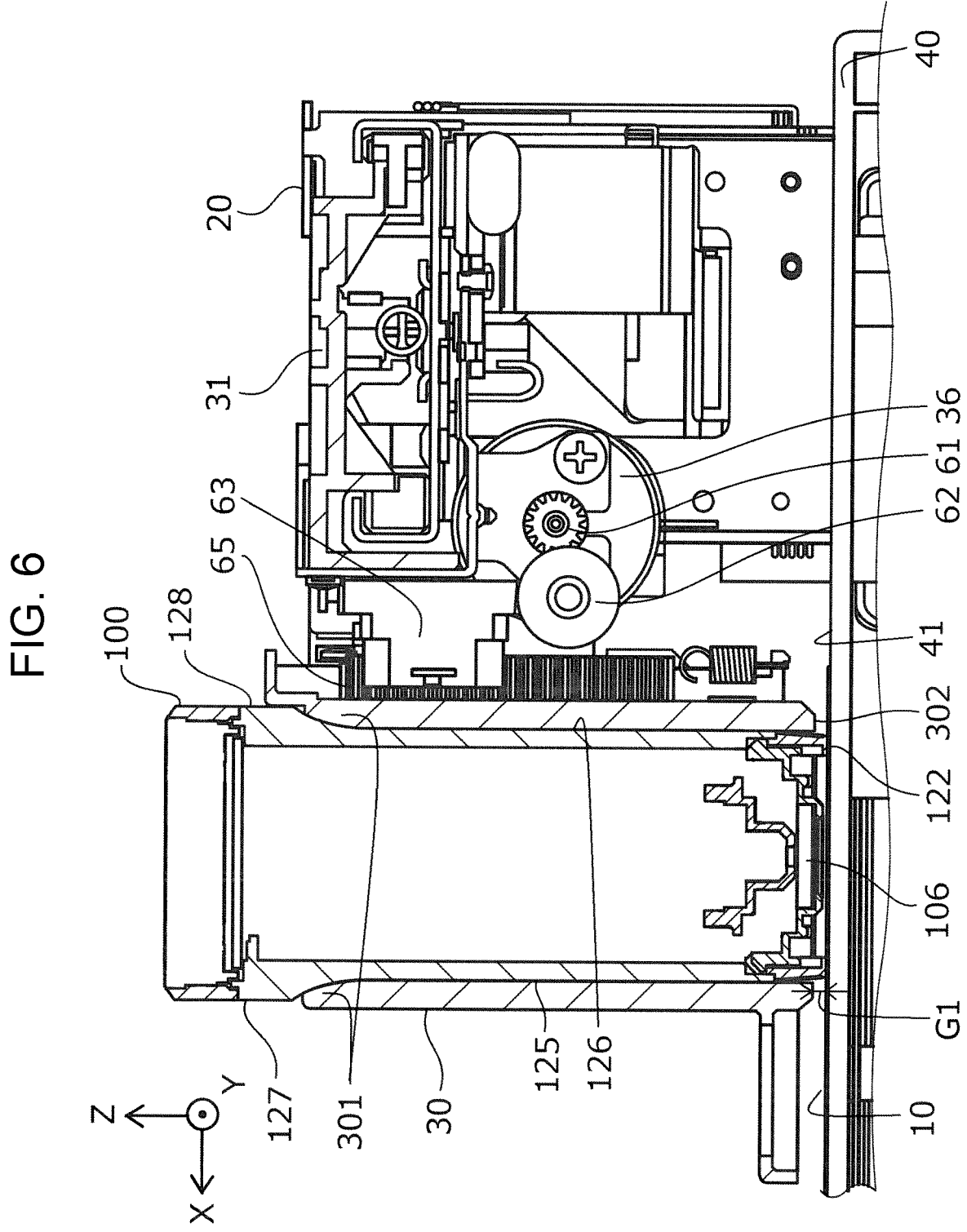
FIG. 6 is a rear view illustrating a periphery of the carriage of the color measurement apparatus according to the example of the present disclosure, and is a view illustrating a disposition at a moment at which the colorimeter of FIG. 1 is accommodated, the carriage is moved downward from the state of FIG. 5, and a color measurement portion comes into contact with a color measurement target.
Figure 7:
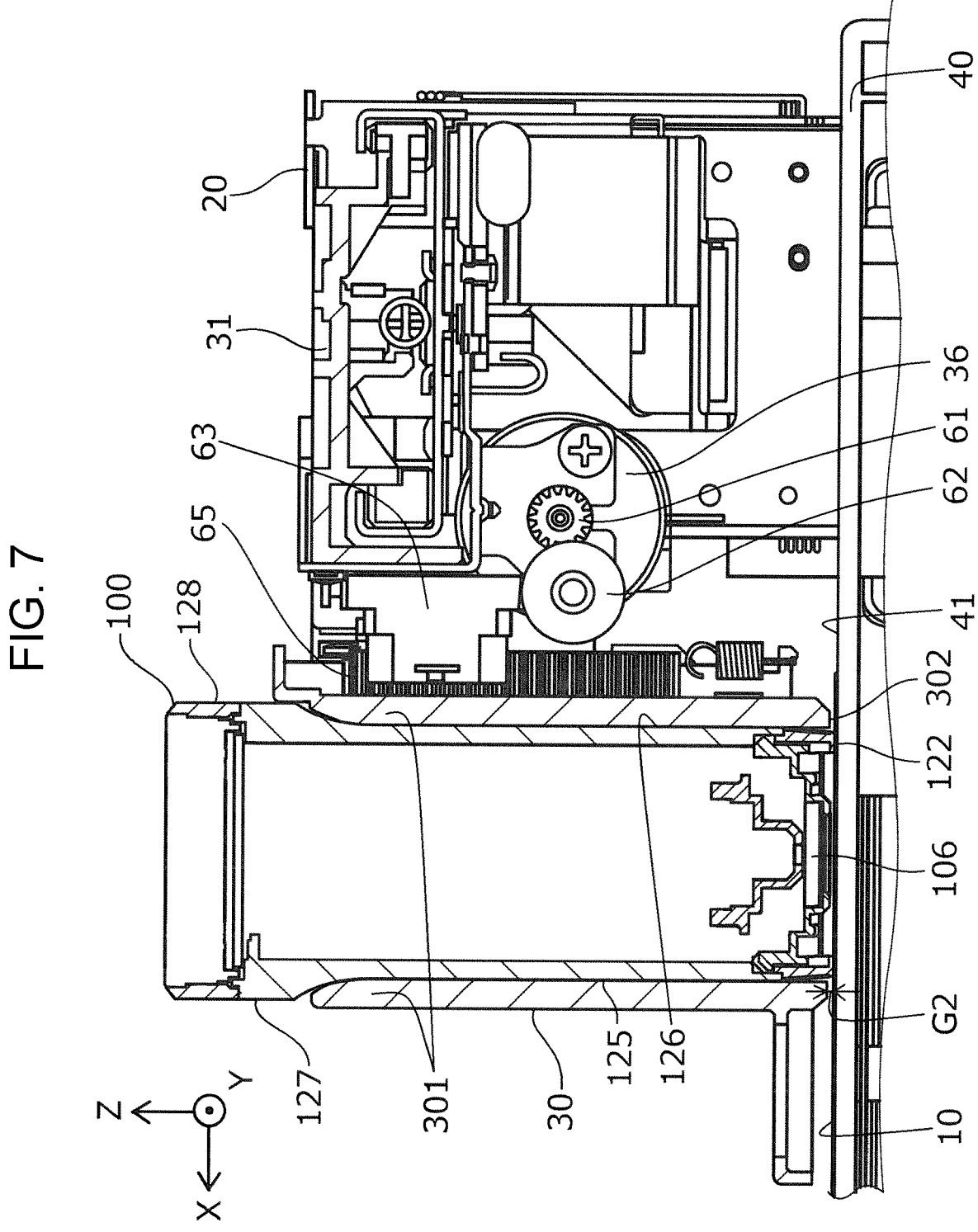
FIG. 7 is a rear view illustrating a periphery of the carriage of the color measurement apparatus according to the example of the present disclosure, and is a view illustrating a disposition when the colorimeter of FIG. 1 is accommodated, the carriage is further moved downward from the state of FIG. 6, and a color of the color measurement target is measured.

FIG. 6 is a view illustrating a disposition at the moment at which the carriage is moved downward in the –Z direction from the state of FIG. 5 and the color measurement surface 122 of the colorimeter 100 comes into contact with the color chart 10. For example, in the present example, a gap G1 in the Z-axis direction between the bottom surface 302 of the carriage 30 and the color chart 10 at this time is 2 mm. Here, in the present example, the colorimeter 100 is accommodated in the carriage 30 in a state in which the projection portion 127 and the projection portion 128 are caught and placed by their own weight on the rib 301 provided in the carriage 30, and the color measurement surface 122 of the colorimeter 100 is configured to protrude in the –Z direction from a hole portion 302a provided in the bottom surface 302 of the carriage 30 illustrated in FIG. 4. Therefore, as illustrated in FIG. 7, when the carriage 30 is further moved in the –Z direction from the state of FIG. 6, its own weight of the colorimeter 100 is applied to the color measurement surface 122. FIG. 7 illustrates a disposition when the color of the color measurement target is measured, that is, the disposition when the color of the color patch 11 and the black frame 12 of the color chart 10 is measured. For example, in the present example, the gap G2 in the Z-axis direction between the bottom surface 302 of the carriage 30 and the color chart 10 at this time is 1 mm. In other words, in the color measurement apparatus 1 of the present example, when the color of the color measurement target is measured, the color measurement surface 122 is in contact with the color measurement target, but the bottom surface 302 of the carriage 30 is in a state in which a gap is provided.

In the color measurement apparatus 1 of the present example, the color measurement is performed in a state in which the entire periphery of the color measurement surface 122 of the colorimeter 100 viewed from the Z-axis direction comes into contact with the color chart 10 on the support base 41 and follows the surface of the color chart 10. With such a configuration, color measurement can be performed in a state in which the color measurement port 106 that is an optical axis opening of the colorimeter 100 is covered with the color measurement surface 122, so that it is unlikely affected by external light and color measurement accuracy rises. Even in the state of FIG. 6, color measurement can be performed in a state of being unlikely to be affected by external light, but since the carriage 30, the colorimeter 100, and the support base 41 have a tolerance due to manufacturing variations in parts or the like, the holding position of the colorimeter 100 of the carriage 30 or the distance from the color measurement surface 122 to the support base 41 may deviate. However, by further lowering the carriage 30 from the state of FIG. 6, color measurement can be performed without being affected by such a tolerance.

In addition, in a state of FIG. 7, the gap G2 is provided between the bottom surface 302 of the carriage 30 and the color chart 10, and the bottom surface 302 of the carriage 30 and the color chart 10 are in a state of being separated from each other. Therefore, the weight of the carriage 30 is not transmitted to the color chart 10, and it is in a state in which only its own weight of the colorimeter 100 is applied to the color chart 10. Therefore, the colorimeter 100 is in contact with the color chart 10 in a state in which an appropriate load is applied, so that the color chart 10 is unlikely to be damaged.

Figure 8:
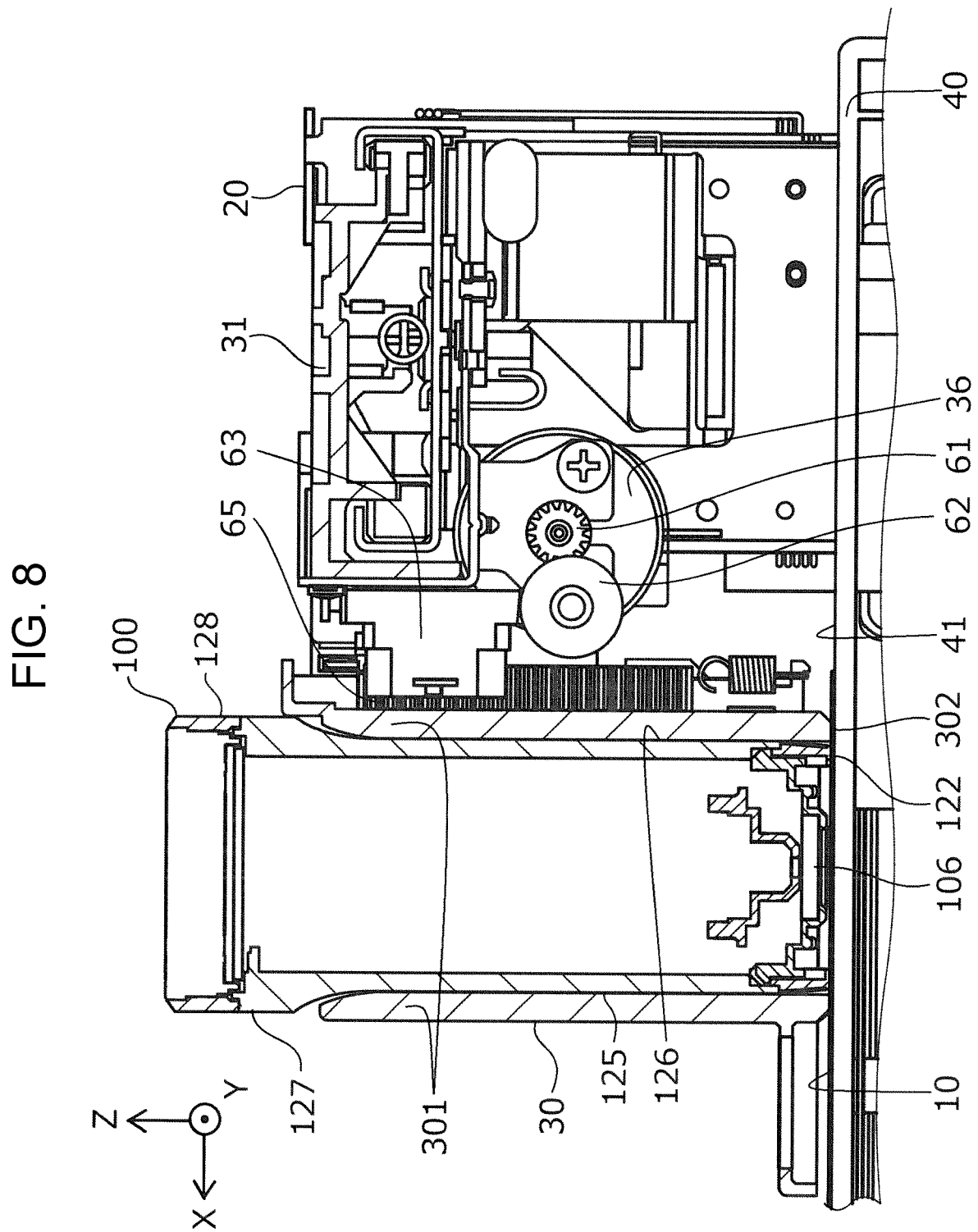
FIG. 8 is a rear view illustrating a periphery of the carriage of the color measurement apparatus according to the example of the present disclosure, and is a view illustrating a disposition when the colorimeter of FIG. 1 is accommodated, the carriage is further moved downward from the state of FIG. 7, and a bottom surface of the carriage comes into contact with the color measurement target.

The color measurement apparatus 1 of the present example can measure color of various color measurement targets. The color measurement target that can be color-measured by the color measurement apparatus 1 of the present example has various thicknesses. Therefore, the color measurement apparatus 1 of the present example brings the carriage 30 into contact with the color measurement target by moving the carriage 30 in the Z-axis direction with respect to the color measurement target to be used, and the abutting height, which is the height of the carriage 30 at the contact time, can be measured. Describing from another viewpoint, the abutting height of the carriage 30 is a height of the carriage 30 when the color measurement target is abutted. Specifically, in the color measurement apparatus 1 of the present example, in order to know the abutting height of the carriage 30, by bringing the bottom surface 302 of the carriage 30 in contact with the color measurement target and driving the Z-axis movement direction movement motor 36 to continue lowering the height of the carriage 30 until a threshold value at which the load of the Z-axis movement direction movement motor 36 is present is exceeded, the height exceeding the threshold value is measured, so that the abutting height of the carriage 30 can be known. FIG. 8 is a view illustrating a state when, in order to know the abutting height of the carriage 30, the bottom surface 302 of the carriage 30 abuts the color chart 10 that is a color measurement target and the threshold value at which the load of the Z-axis movement direction movement motor 36 is present is exceeded.

Figure 9:
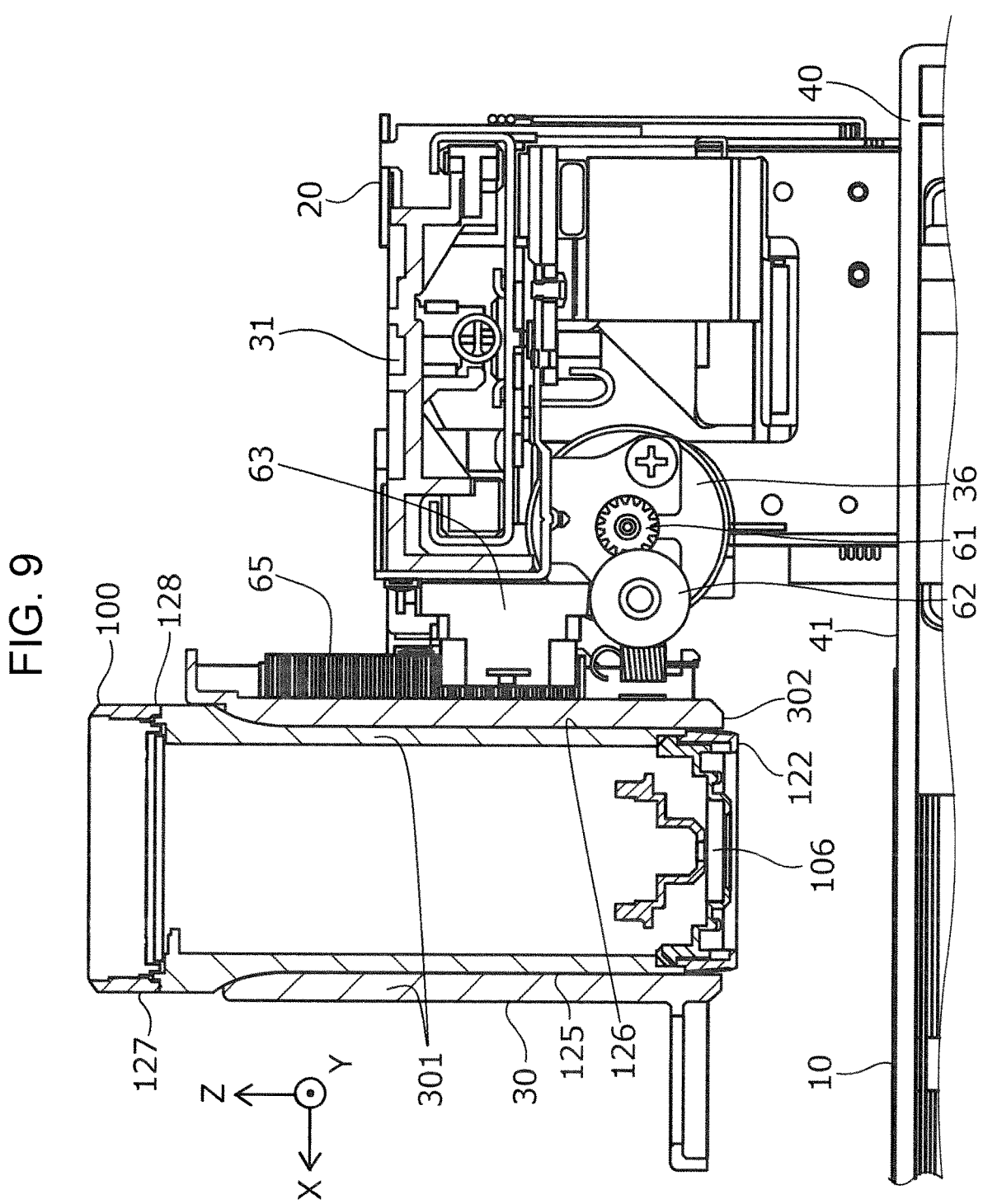
FIG. 9 is a rear view illustrating a periphery of the carriage of the color measurement apparatus according to the example of the present disclosure, and is a view illustrating a disposition in a state in which the colorimeter of FIG. 1 is accommodated and the carriage is moved to a home position.

In addition, as described above, the color measurement apparatus 1 of the present example is provided with a home position sensor 39 that measures whether or not the position of the carriage 30 in the Z-axis direction with respect to the gantry 20 is a home position. FIG. 9 illustrates a state in which the carriage 30 is at the home position in the Z-axis direction.

As described above, the color measurement apparatus 1 of the present example is a color measurement apparatus configured to attach the colorimeter 100 that measures the color of the color patch 11 of the color chart 10 in which the color patch 11 and the black frame 12 as a measured portion for grasping the position of the color patch 11 are provided. The color measurement apparatus 1 of the present example includes the support base 41 that supports the color chart 10 and the carriage 30 that supports the colorimeter 100. In addition, the color measurement apparatus 1 of the present example includes the gantry 20, and the gantry 20 includes the carriage motor 22, the carriage belt 23, the front pulley 24, the back pulley 25, or the like, and serves as a scanning mechanism portion that causes the carriage 30 to perform scanning on the support base 41. In addition, the color measurement apparatus 1 of the present example includes the main substrate 52 or the like as a control portion that controls the colorimeter 100, the carriage 30, and the scanning mechanism portion.

Hereinafter, as an example of a control method performed using the color measurement apparatus 1 of the present example, a flow of measuring the black frame 12 as a measured portion by the front side sensor 37 as a first measurement portion and the rear side sensor 38 as a second measurement portion and specifying the position of the color patch 11 by the measurement result, will be described. Here, as illustrated in FIG. 4 or the like, the carriage 30 has the support portion 310 that supports the colorimeter 100, and the support portion 310 has the hole portion 302a that is an opening portion that exposes the color measurement surface 122 of the colorimeter 100 from the carriage 30 in a state in which the colorimeter 100 is supported. The front side sensor 37 and the rear side sensor 38 that measure the black frame 12 as a measured portion and the corner measured portion 13 with the hole portion 302a interposed therebetween are provided in the carriage 30.

Figure 11:
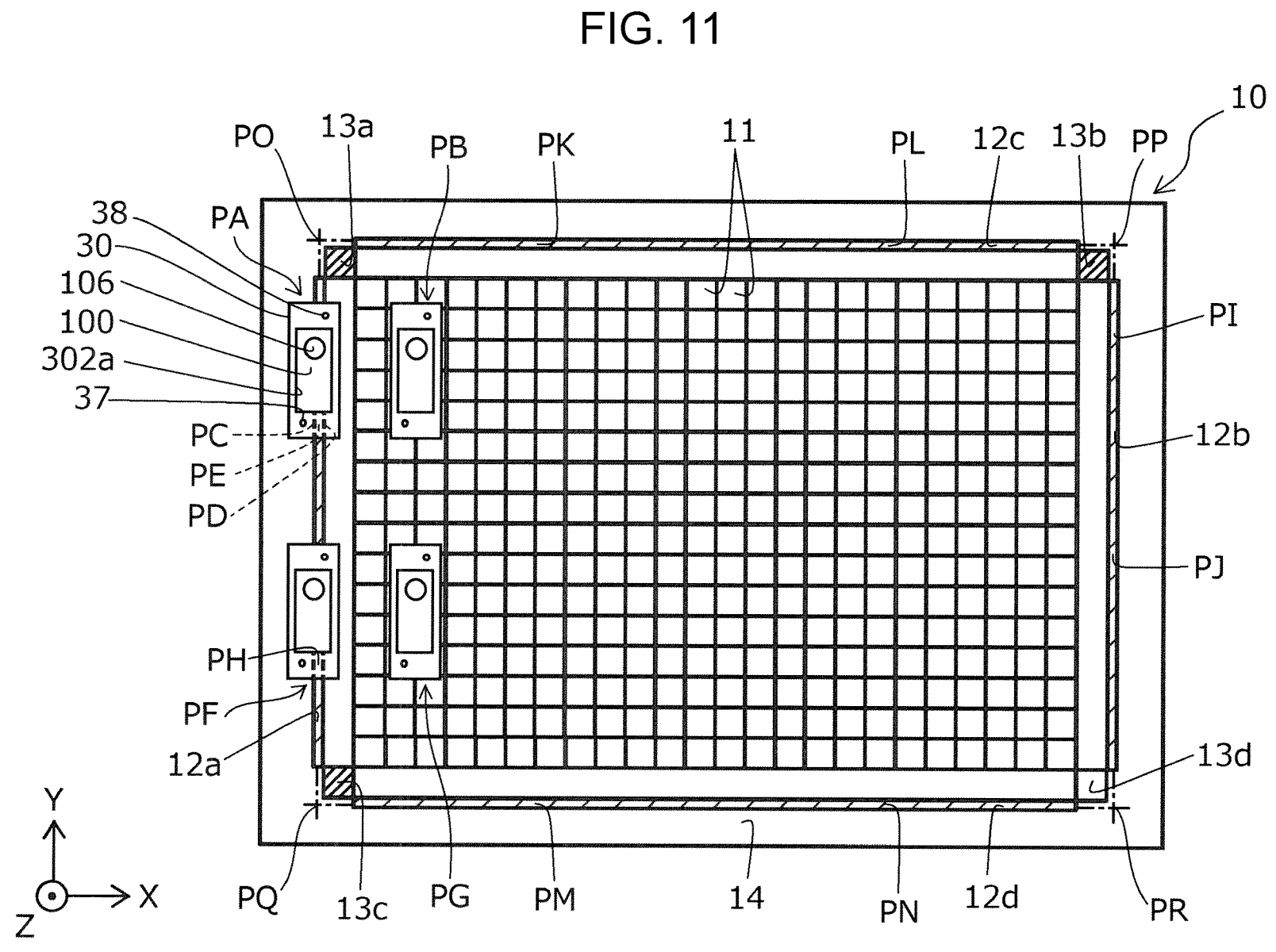
Figure 12:
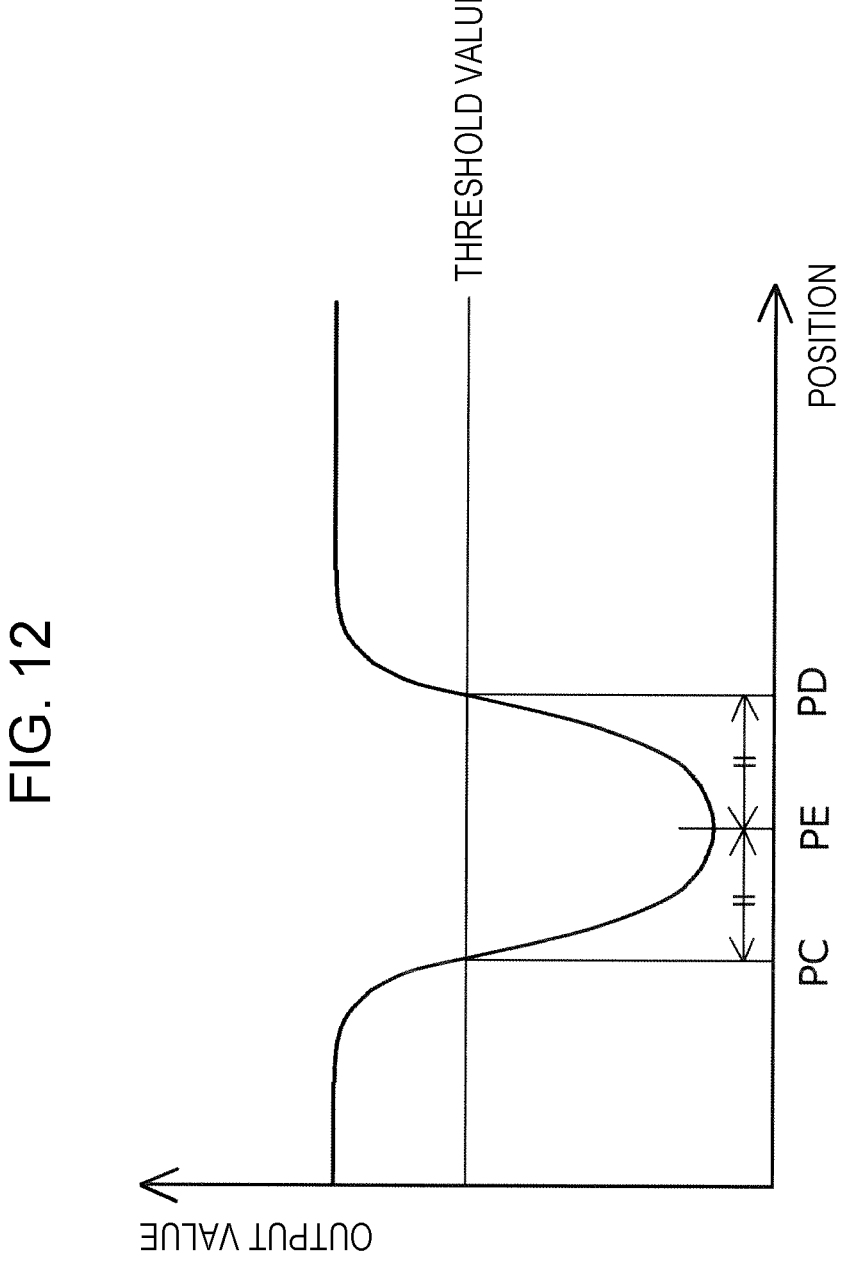
FIG. 12 is a graph illustrating a relationship between a position of the first measurement portion and an output value when a measured portion is measured by the first measurement portion.

Further, Hereinafter, the details of the front side sensor 37 and the rear side sensor 38 of the color measurement apparatus 1 of the present example and the details of the color chart 10 that can be measured by the color measurement apparatus 1 of the present example will be described together. Here, FIG. 10 is a flowchart illustrating a flow of specifying the position of the color patch 11 by the measurement results of the black frame 12 by the front side sensor 37 and the rear side sensor 38. In addition, FIG. 11 is a plan view of the color chart 10 and is a view for describing the positions of the front side sensor 37 and the rear side sensor 38 when the black frame 12 is measured by the front side sensor 37 and the rear side sensor 38. FIG. 11 is a perspective view of the carriage 30 such that positions of respective components are easy to understand. FIG. 12 is a graph illustrating the relationship between the position of the rear side sensor 38 and the output value when a black frame 12a is measured by the rear side sensor 38.

In any control method illustrated in the flowchart of FIG. 10, each step is executed by the control of the main substrate 52 as a control portion. In addition, in the control method illustrated in the flowchart of FIG. 10, the inclination of the color chart 10 illustrated in FIG. 11 with respect to the support base 41 when viewed from the Z-axis direction is specified, and based on the result, the position of the color patch 11 is specified. The color chart 10 illustrated in FIG. 11 is a quadrangle, and the black frame 12 that is a linear measured portion as a measured portion along four sides of the color chart 10 in a periphery of an area in which the color patch 11 is provided. Specifically, the color chart 10 illustrated in FIG. 11 includes, as the black frame 12, the black frame 12a provided in the vicinity of the side of the color chart 10 on the −X direction side, a black frame 12b provided in the vicinity of the side of the color chart 10 on the +X direction side, a black frame 12c provided in the vicinity of the side of the color chart 10 on the +Y direction side, and a black frame 12d provided in the vicinity of the side of the color chart 10 on the −Y direction side. The storage portion 52a of the color measurement apparatus 1 stores information regarding the positional influence of each of the color patches 11 with respect to the black frame 12a, the black frame 12b, the black frame 12c, and the black frame 12d. That is, it is configured such that the position of each of the color patches 11 can be grasped from the position of each of the black frames 12. Each of the black frames 12 of the present example is continuously provided along the side of the color chart 10, but, for example, may be discontinuously provided by a dotted line, or further may be configured to be provided in only specific positions along the side.

When the flowchart of FIG. 10 is started, first, in a step S110, the carriage motor 22 or the like is driven to move the carriage 30 to a position PA illustrated in FIG. 11. Then, in a step S120, the gantry motor 47 or the like is driven to move the carriage 30 to a position PB illustrated in FIG. 11. Here, when the carriage 30 moves from the position PA to the position PB, the front side sensor 37 is turned on and the output value thereof is recorded. The graph in FIG. 12 illustrates an output value of the front side sensor 37 when the carriage 30 is moved from the position PA to the position PB.

Next, in a step S130, boundary positions PC and PD of the black frame 12a with respect to the fabric portion 14 are obtained from the output value acquired in the step S120. Specifically, the point in time when the output value falls below a predetermined threshold value is set as the boundary position PC, and the point in time when the output value exceeds the threshold value again is set as the boundary position PD. A midpoint between the boundary positions PC and PD is obtained as a center position PE of the black frame 12a.

Next, in a step S140, the carriage motor 22, the gantry motor 47, or the like is driven to move the carriage 30 to a position PF illustrated in FIG. 11. Then, the gantry motor 47 or the like is further driven to move the carriage 30 to a position PG illustrated in FIG. 11. Even at this time, the front side sensor 37 is turned on and the output value thereof is recorded. Then, a center position PH of the black frame 12a is obtained from the output value. Here, the center position PH is deviated in the Y-axis direction with respect to the center position PE, and the straight line coupling the center position PH and the center position PE is the center straight line of the black frame 12a. In a step S150, the center straight line of the black frame 12a is obtained.

Next, in a step S160, the center positions PI and PJ of the black frame 12b and the center straight line of the black frame 12b are obtained by the same procedure as in the step S110 to the step S150. However, in this case, the rear side sensor 38 is used instead of the front side sensor 37. As illustrated in FIG. 11, the rear side sensor 38 is provided on the +X direction side of the front side sensor 37. Therefore, by measuring the black frame 12a on the −X direction side by the front side sensor 37 and measuring the black frame 12b on the +X direction side by the rear side sensor 38, the scanning range of the gantry 20 and the carriage 30 in the X-axis direction can be narrowed, and the length of the support base 41 in the X-axis direction can be shortened.

Next, in a step S170, center positions PK and PL of the black frame 12c and the center straight line of the black frame 12c are obtained by the same procedures as in the step S110 to the step S150. However, the movement direction of the carriage 30 when the black frame 12c is measured is the direction along the Y-axis direction. In addition, at this time, the rear side sensor 38 is used. Next, in a step S180, center positions PM and PN of the black frame 12d and the center straight line of the black frame 12d are obtained by the same procedures as in the step S110 to the step S150. The movement direction of the carriage 30 when the black frame 12d is measured is also the direction along the Y-axis direction. In addition, at this time, the front side sensor 37 is used. As illustrated in FIG. 11, the front side sensor 37 is provided on the −Y direction side of the rear side sensor 38. Therefore, by measuring the black frame 12c on the +Y direction side by the rear side sensor 38 and measuring the black frame 12d on the −Y direction side by the front side sensor 37, the scanning range of the carriage 30 in the Y-axis direction can be narrowed, and the length of the support base 41 in the Y-axis direction can be shortened.

Next, in a step S190, the intersections PO, PP, PQ, and PR are obtained from the center straight line of the black frame 12a, the center straight line of the black frame 12b, the center straight line of the black frame 12c, and the center straight line of the black frame 12d. Here, the main substrate 52 can recognize, for example, whether or not the color chart 10 having an originally rectangular shape, due to deformation or the like, is changed into being in a trapezoidal shape, or the like, from the positions of the intersections PO, PP, PQ, and PR. Therefore, in a step S200, the main substrate 52 performs correction processing such as trapezoidal correction from the positions of the intersections PO, PP, PQ, and PR, at the same time, specifies the position of the color patch 11, and ends the present flowchart. When the present flowchart is ended, a color measurement operation can be started for the color patch 11 of which the position is specified by the present flowchart.

As described above, the color measurement apparatus 1 of the present example is provided with the front side sensor 37 and the rear side sensor 38 with the hole portion 302a interposed therebetween, and specifies the position of the color patch 11 based on the measurement results of the front side sensor 37 and the rear side sensor 38 controlled by the main substrate 52. In this way, by specifying the position of the color patch 11 by the measurement results of the front side sensor 37 and the rear side sensor 38 provided with the hole portion 302a interposed therebetween, a movement distance of the carriage 30 with respect to the black frame 12 can be shortened, and either the front side sensor 37 or the rear side sensor 38 can measure the black frame 12.

Specifically, the front side sensor 37 and the rear side sensor 38 are provided with the hole portion 302a interposed in the Y-axis direction, so that when the black frame 12c and the black frame 12d are measured, the movement distance of the carriage 30 can be shortened by at least the length of the hole portion 302a in the Y-axis direction. The color measurement apparatus 1 of the present example can grasp the position of the color patch 11 provided on the color chart 10 from the measurement position of the black frame 12 by measuring the black frame 12, and by shortening the movement distance of the carriage 30 in the Y-axis direction, the size of the color measurement apparatus 1 can be suppressed from being increased in the Y-axis direction. Therefore, the color measurement apparatus 1 of the present example has a configuration in which the color patch 11 provided on the color chart 10 can be automatically and easily measured without any positional deviation without an increase in size.

In addition, since the color patch 11 can be automatically positioned, the time for the user to manually position the color patch 11 can be shortened, and variation in measurement can be suppressed, so that color measurement accuracy can be improved. Since the color measurement apparatus 1 of the present example can also measure the inclination of the color chart 10 with respect to the support base 41 when viewed from the Z-axis direction, the color measurement apparatus is configured to attach the colorimeter 100 that measures the color of the color patch 11 of the color chart 10 provided with the black frame 12 to grasp the inclination of the color chart 10 with respect to the support base 41 when viewed from the Z-axis direction, and can also be expressed as a color measurement apparatus that specifies the inclination of the color chart 10 by the measurement results of the front side sensor 37 and the rear side sensor 38.

In addition, as described above, the front side sensor 37 and the rear side sensor 38 are provided at positions different from each other not only in the Y-axis direction as the first direction but also in the X-axis direction as the second direction that is the direction intersecting the Y-axis direction. Therefore, as illustrated in FIG. 11, with respect to the color chart 10 in which the black frame 12 is provided at two different positions in the Y-axis direction and two different positions in the X-axis direction, the movement distance of the carriage 30 can be shortened even in the X-axis direction and even in the Y-axis direction. Therefore, the color measurement apparatus 1 of the present example can particularly effectively suppress a size of the color measurement apparatus 1 from being increased, and at the same time, can perform color measurement on the color patch 11 provided in the color chart 10 without positional deviation.

Here, as illustrated in FIG. 4 and FIG. 11, in the color measurement apparatus 1 of the present example, the front side sensor 37 and the rear side sensor 38 are provided substantially diagonally with the hole portion 302a as a reference. However, the present disclosure is not limited to this configuration. The front side sensor 37 and the rear side sensor 38 may be provided to interpose the hole portion 302a in at least one of the X-axis direction and the Y-axis direction, and may not be provided on a diagonal line.

In addition, the color chart 10 illustrated in FIG. 11 is a quadrangle, and the black frame 12 that is a linear measured portion as a measured portion along four sides of the color chart 10 is provided. As described above, the color measurement apparatus 1 of the present example can specify the position of the color patch 11 based on the result obtained by measuring the black frame 12 by the front side sensor 37 and the rear side sensor 38, by the control of the main substrate 52. With such a configuration, since the four sides of the color chart 10 can be measured, for example, the intersections PO, PP, PQ, and PR of the four sides of the color chart 10 are calculated, so that the inclination or the like of the color chart 10 with respect to the support base 41 can be accurately grasped, and the position of the color patch 11 can be particularly accurately specified.

In addition, for example, the color chart 10 made of a soft material is easily deformed, and the color chart 10 having a rectangular shape may be changed into being in a trapezoidal shape and be supported by the support base 41. In such a case, when an attempt is made to specify the position of the color patch 11 assuming that the color chart 10 is rectangular, there is a concern that the color patch 11 deviates from an actual position. However, the color measurement apparatus 1 of the present example, based on the result obtained by the front side sensor 37 and the rear side sensor 38 measuring the black frame 12 corresponding to each side of the color chart 10 at at least two points by the control of the main substrate 52, calculates the positions of the center straight lines of the four black frames 12 and the positions of the intersections PO, PP, PQ, and PR among the center straight lines, and specifies the position of the color patch 11 based on the calculated positions of the intersections PO, PP, PQ, and PR. Therefore, although the color chart 10 having a rectangular shape is supported by the support base 41 in a state of being deformed into a trapezoidal shape, the fact that the color chart 10 is changed into being in a trapezoidal shape and is supported by the support base 41 can be grasped based on the measurement results of the front side sensor 37 and the rear side sensor 38, and the position of the color patch 11 can be accurately specified based on the calculated positions of the intersections PO, PP, PQ, and PR.

In the control method of the flowchart of FIG. 10, in the step S200, the main substrate 52 performs correction processing such as trapezoidal correction from the positions of the intersections PO, PP, PQ, and PR, and at the same time, specifies the position of the color patch 11. However, when it is measured that the color chart 10 having a rectangular shape is in a trapezoidal shape and is supported by the support base 41, an error may be displayed on the screen portion 105 or the like of the colorimeter 100. Particularly, for example, when the deformation of the color chart 10 is large and the position of the color patch 11 is outside the operating area of the carriage 30, or the like, it is preferable to display an error.

In addition, as illustrated in FIG. 11, the color chart 10 of FIG. 11 is a quadrangle, and the corner measured portions 13 are provided at the four corners of the color chart 10. A corner measured portion 13a, a corner measured portion 13b, and corner measured portion 13c of the corner measured portion 13 are black patches, but a corner measured portion 13d is a white patch. Then, the color measurement apparatus 1 of the present example can cause the front side sensor 37 and the rear side sensor 38 to measure at least three of the four corner measured portions 13 by the control of the main substrate 52, and can specify the orientation of the color chart 10 supported by the support base 41 based on the measurement results of the front side sensor 37 and the rear side sensor 38.

For example, due to a user's mistake or the like, the color chart 10 having a rectangular shape may be supported by the support base 41 in a direction rotated by 180° when viewed from the Z-axis direction that is the support direction of the support base 41. However, with respect to the color chart 10 that is a quadrangle and provided with the corner measured portion 13 as a measured portion at at least three corners of the four corners of the color chart 10, by specifying the direction of the color chart 10 supported by the support base 41 based on the results obtained by the front side sensor 37 and the rear side sensor 38 measuring the corner measured portion 13, although the color chart 10 having a rectangular shape is supported by the support base 41 in a direction rotated by 180° when viewed from the Z-axis direction, this can be recognized, and the position of the color patch 11 can be accurately specified. In addition, in such a case, an error can be displayed on the screen portion 105 or the like of the colorimeter 100. Although the color chart 10 is not inclined up to the direction rotated by 180° when viewed from the Z-axis direction, when the inclination of the color chart 10 when viewed from the Z-axis direction is large and, for example, the position of the color patch 11 is out of the operation area of the carriage 30, or the like, it is preferable to display an error.

Specifically, the color measurement apparatus 1 of the present example measures whether the corner measured portion 13 at the upper left position in FIG. 11 among the corner measured portions 13 is black or white, by the rear side sensor 38. Next, the rear side sensor 38 measures whether the corner measured portion 13 at the upper right position in FIG. 11 among the corner measured portions 13 is black or white. Then, the front side sensor 37 measures whether the corner measured portion 13 at the lower left position in FIG. 11 is black or white. In addition, the measurement of the corner measured portion 13 at the lower right position in FIG. 11 may be performed, but may not be performed. The front side sensor 37 is used when the corner measured portion 13 at the lower right position in FIG. 11 is measured.

When all of the corner measured portions 13 at the positions of the three corner portions of the upper left, the upper right, and the lower left in FIG. 11 are black, it is determined that the color chart 10 is disposed on the support base 41 in a normal orientation. On the other hand, when the color chart 10 is disposed on the support base 41 in an orientation rotated by 180° when viewed from the Z-axis direction, since the corner measured portion 13d is disposed at the corner portion at the upper left position in FIG. 11, the measurement result of the corner measured portion 13 at this position by the rear side sensor 38 is white, and the main substrate 52 recognizes that the color chart 10 is supported by the support base 41 in a direction rotated by 180° when viewed from the Z-axis direction.

As described above, the color measurement apparatus 1 of the present example can automatically specify the position or the inclination of the color chart 10 on the support base 41, that is, the position of the color patch 11 by executing the control method of the flowchart of FIG. 10. On the other hand, although the control method of the flowchart of FIG. 10 is executed by using the color measurement apparatus 1 of the present example, there is a concern that the position of the color patch 11 cannot be automatically specified. For example, when the output value crossing the threshold value illustrated in FIG. 12 is not obtained due to the usage environment or the like of the color measurement apparatus 1 when the black frame 12 is measured by the front side sensor 37 or the rear side sensor 38, or when the inclination of the color chart 10 on the support base 41 is excessively large, the color measurement apparatus 1 of the present example cannot automatically specify the position of the color patch 11 although the control method of the flowchart of FIG. 10 is executed.

Therefore, the color measurement apparatus 1 of the present example is configured such that a user can manually specify the position of the color patch 11 when the position of the color patch 11 cannot be automatically specified. Hereinafter, an example of a method when the user manually specifies the position of the color patch 11 will be described with reference to FIG. 13.

Figure 13:
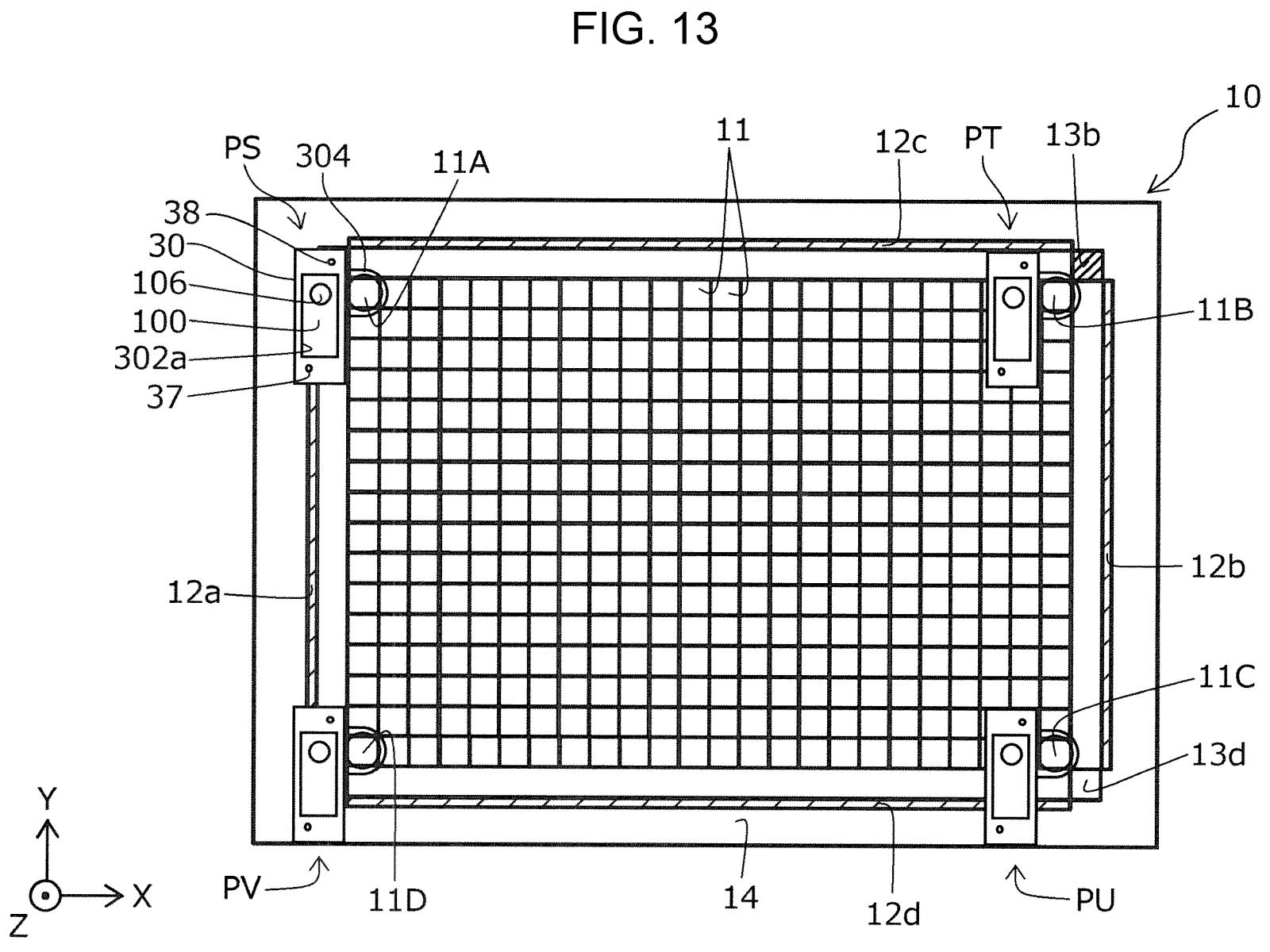

In the color measurement apparatus 1 of the present example, when the position of the color patch 11 cannot be automatically specified, or the like, the user holds, for example, a manual adjustment portion 305 or the like illustrated in FIGS. 2 and 3, and as illustrated in FIG. 13, the position of the carriage 30 is adjusted to a position PS such that the position of a positioning frame 304 coincides with the position of an upper left patch 11A of the color patch 11 at the upper left in plan view. Next, the user acquires the coordinate of the carriage 30 by operating the colorimeter 100 via the operation portion 110 or the like in a state in which the carriage 30 is positioned at the position PS.

Next, the user adjusts the position of the carriage 30 to a position PT such that the position of the positioning frame 304 coincides with the position of an upper right patch 11B of the color patch 11 at the upper right in plan view, and acquires the coordinate thereof. Next, the user adjusts the position of the carriage 30 to a position PU such that the position of the positioning frame 304 coincides with the position of a lower right patch 11C of the color patch 11 at the lower right in plan view, and acquires the coordinate thereof. Further, the user adjusts the position of the carriage 30 to a position PV such that the position of the positioning frame 304 coincides with the position of a lower left patch 11D of the color patch 11 at the lower left in plan view, and acquires the coordinate thereof.

Then, the color measurement apparatus 1 of the present example specifies the position of each of the color patches 11 based on the coordinates of the position PS, the position PT, the position PU, and the position PV. In the above description, the position of each of the color patches 11 is specified based on the coordinates of the four positions of the position PS, the position PT, the position PU, and the position PV, but the position of each of the color patches 11 may be specified based on the coordinates of any three positions of the position PS, the position PT, the position PU, and the position PV. In addition, in the above description, the coordinates of the four positions are acquired in the order of the position PS, the position PT, the position PU, and the position PV, in other words, in clockwise order in plan view, but the acquisition order of the coordinates is not particularly limited.

In addition, in manually specifying the position of the color patch 11 as described above, when at least one of the position PS, the position PT, the position PU, and the position PV is not at a position within the assumed range, the error display may be displayed by a computer or the like coupled to the color measurement apparatus 1. Further, at the time of measuring the position PS, the position PT, the position PU, and the position PV, when it is determined that one of these is not at a position within the assumed range, an error may be immediately displayed without waiting for the measurement results of the other positions. After the error display, the display for prompting the manual operation of specifying the position of the color patch 11 again may be performed, or the display for prompting the automatic operation of specifying the position of the color patch 11 illustrated by the control method of the flowchart of FIG. 10, or the like may be performed.

The present disclosure is not limited to the above-described examples, and can be realized in various configurations without departing from the gist of the present disclosure. For example, the color measurement apparatus 1 of the present example is configured to measure the color of the color measurement target in a state of being in contact with the color measurement target, but may be applied to a configuration in which color measurement is performed on the color measurement target in a state of not being in contact with the color measurement target. In addition, for example, technical features in the embodiments corresponding to technical features in each form described in a column of the outline of the disclosure can be appropriately replaced or combined to partially or entirely solve the above-described problems, or to partially or entirely achieve the above-described advantageous effects. In addition, unless the technical features are described as essential in the present specification, deletion is possible as appropriate.

What is claimed is:

1. A color measurement apparatus to which a colorimeter that measures a color of a patch of a color measurement target provided with the patch and a measured portion for grasping a position of the patch is configured to be attached, the color measurement apparatus comprising:

a support base that supports the color measurement target;

a carriage that supports the colorimeter;

a scanning mechanism portion that causes the carriage to perform scanning on the support base; and a control portion that controls the scanning mechanism portion, wherein the carriage includes a support portion that supports the colorimeter and has an opening portion that exposes a color measurement portion of the colorimeter from the carriage in a state in which the colorimeter is supported by the support portion, and a first measurement portion and a second measurement portion that measure the measured portion and are provided to interpose the opening portion, and the control portion specifies a position of the patch by measurement results of the first measurement portion and the second measurement portion.

2. The color measurement apparatus according to claim 1, wherein the scanning mechanism portion is configured to move the carriage in a first direction and in a second direction intersecting the first direction, and the first measurement portion and the second measurement portion are provided at different positions in any direction of the first direction and the second direction.

3. The color measurement apparatus according to claim 1, wherein the color measurement target is a quadrangle and provided with a linear measured portion as the measured portion along four sides of the color measurement target, and the control portion specifies the position of the patch based on results obtained by the first measurement portion and the second measurement portion measuring the linear measured portion.

4. The color measurement apparatus according to claim 3, wherein the control portion calculates positions of four straight lines along the linear measured portion and positions of intersections of the straight lines based on results obtained by the first measurement portion and the second measurement portion measuring the linear measured portion corresponding to every side of the color measurement target at at least two points, and specifies the position of the patch based on the calculated position of the intersection.

5. The color measurement apparatus according to claim 1, wherein the color measurement target is a quadrangle and is provided with a corner measured portion as the measured portion at at least three corners of four corners of the color measurement target, and the control portion specifies an orientation of the color measurement target supported by the support base based on results obtained by the first measurement portion and the second measurement portion measuring the corner measured portion.

6. A control method that controls a color measurement apparatus to which a colorimeter that measures a color of a patch of a color measurement target provided with the patch and a measured portion for grasping a position of the patch is configured to be attached, the color measurement apparatus including a support base that supports the color measurement target, a carriage that supports the colorimeter, and a scanning mechanism portion that causes the carriage to perform scanning on the support base, in which the carriage includes a support portion that supports the colorimeter and has an opening portion that exposes a color measurement portion of the colorimeter from the carriage in a state in which the colorimeter is supported by the support portion, and a first measurement portion and a second measurement portion that measure the measured portion and are provided to interpose the opening portion, the control method comprising:

specifying a position of the patch by measurement results of the first measurement portion and the second measurement portion.

* * * * *